United States Patent
Chorney et al.

(10) Patent No.: US 7,765,758 B2
(45) Date of Patent: Aug. 3, 2010

(54) REINFORCED WOOD FLOORING WITH A DISCONTINUOUS GLUE PATTERN FOR TRUCK TRAILERS AND CONTAINERS

(75) Inventors: Marc Chorney, Hastings, MN (US); Ziqiang Lu, Red Wing, MN (US)

(73) Assignee: Rockland Flooring, Red Wing, MN (US)

( * ) Notice: Subject to any disclaimer, the term of this patent is extended or adjusted under 35 U.S.C. 154(b) by 0 days.

(21) Appl. No.: 12/024,882

(22) Filed: Feb. 1, 2008

(65) Prior Publication Data

US 2009/0193747 A1 Aug. 6, 2009

(51) Int. Cl.
*E04B 5/00* (2006.01)
(52) U.S. Cl. .................. 52/411; 52/408; 296/39.1; 296/39.3; 296/191; 428/33; 428/55; 428/58; 428/77; 428/297.4
(58) Field of Classification Search .................. 52/411, 52/408; 296/181, 182, 191, 39.1, 39.2; 428/33, 428/55, 58, 77, 297.4, 299.1
See application file for complete search history.

(56) References Cited

U.S. PATENT DOCUMENTS

| | | | |
|---|---|---|---|
| 5,509,715 A | | 4/1996 | Scharpf |
| 5,863,091 A | * | 1/1999 | Shepherd et al. ............ 296/204 |
| 5,928,735 A | | 7/1999 | Padmanabhan et al. |
| 6,179,942 B1 | | 1/2001 | Padmanabhan |
| 6,183,824 B1 | | 2/2001 | Padmanabhan et al. |
| 6,318,794 B1 | | 11/2001 | Berube |
| 6,336,265 B1 | | 1/2002 | Niedermair |
| 6,558,765 B2 | | 5/2003 | Padmanabhan |
| 6,558,766 B2 | | 5/2003 | Padmanabhan et al. |
| 2006/0179733 A1 | | 8/2006 | Padmanabhan |

OTHER PUBLICATIONS

HAVCO Wood Flooring, "our composite flooring," Product Article from Havco website at: http://www.havcowp.com/products/composite-flooring.
HAVCO Wood Flooring, "laminated flooring," Product Article from Havco website at: http://www.havcowp.com/products/laminated-oak-flooring.

* cited by examiner

*Primary Examiner*—Richard E Chilcot, Jr.
*Assistant Examiner*—Mark R Wendell
(74) *Attorney, Agent, or Firm*—Crompton, Seager & Tufte, LLC

(57) ABSTRACT

Reinforced wood flooring for truck trailers and containers and methods for making and using the same. A reinforced wood flooring may include a wood member. The wood member may include a plurality of wood strips that are attached together. The wood member may also have a top surface and a bottom surface. An essentially water impermeable underlay may be attached to the bottom surface of the wood member with a discontinuous layer of adhesive.

21 Claims, 11 Drawing Sheets

REINFORCED WOOD FLOORING WITH A DISCONTINUOUS GLUE PATTERN FOR TRUCK TRAILERS AND CONTAINERS

FIELD OF THE INVENTION

The present invention pertains to reinforced wood flooring. More particularly, the present invention pertains to reinforced wood flooring for truck trailers and containers.

BACKGROUND

Conventional truck trailers may utilize a wood flooring, for example hardwood flooring, because of the desirable characteristics that the flooring may provide the trailer. For example, hardwood flooring may have a desirable level of strength and stiffness. This may give the flooring a long life and increase its wear resistance. Of the known wood floorings, each has certain advantages and disadvantages. There is an ongoing need to provide additional floorings and methods for making and using floorings.

BRIEF SUMMARY

The invention provides design, material, manufacturing method, and use alternatives for reinforced floors for truck trailers and containers. An example reinforced wood flooring may include a wood member. The wood member may include a plurality of wood strips that are attached together. The wood member may also have a top surface and a bottom surface. An essentially water impermeable underlay may be attached to the bottom surface of the wood member with a discontinuous layer of adhesive. The reinforced floor may be used for truck trailers, containers, etc.

An example method of manufacturing a reinforced wood flooring may include providing a wood member. The wood member may include a plurality of wood strips that are attached together. The wood member may also have a top surface and a bottom surface. The method may also include attaching an essentially water impermeable underlay to the bottom surface of the wood member with a discontinuous layer of adhesive. The reinforced floor may be used for truck trailers, containers, etc.

Another example reinforced wood flooring for truck trailers and containers may include a wood member. The wood member may include a plurality of hardwood strips that are attached together. The wood member may also have a top surface and a bottom surface. An essentially water impermeable fiber reinforced plastic member may be attached to the bottom surface of the wood member with a discontinuous layer of adhesive. The fiber reinforced plastic member may include a plurality of glass fibers and aramid fibers.

The above summary of some embodiments is not intended to describe each disclosed embodiment or every implementation of the present invention. The Figures, and Detailed Description, which follow, more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
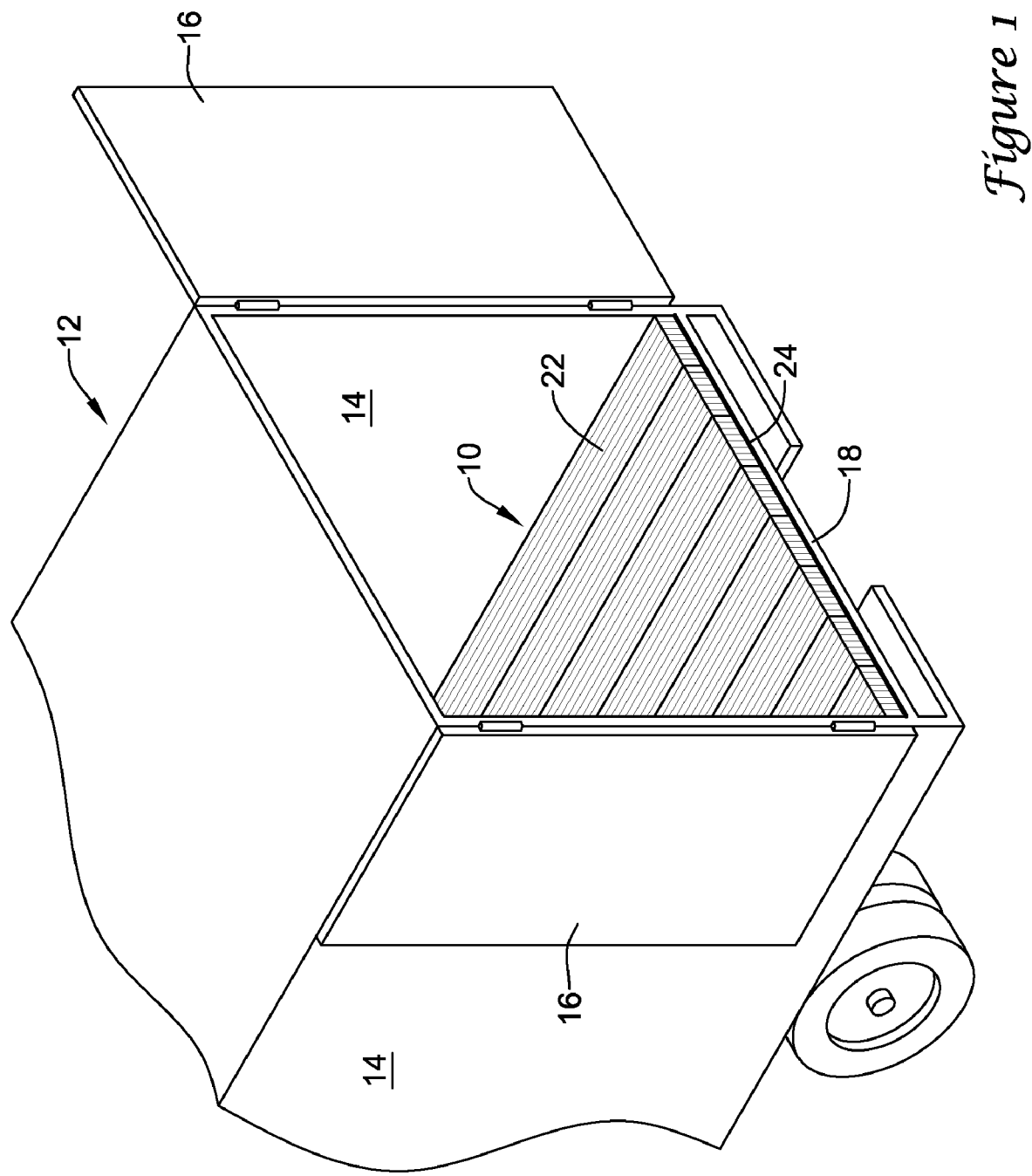
FIG. 1 is a plan overview illustrating a reinforced floor disposed in a truck trailer.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The drawings, which are not necessarily to scale, depict illustrative embodiments and are not intended to limit the scope of the invention.

FIG. 1 is a plan view of an example reinforced wood flooring 10. In this example, flooring 10 is disposed in a truck trailer 12. Although flooring 10 is illustrated within trailer 12, this is not intended to limit the invention as flooring 10 may be used, for example, with a number of different structures including containers (e.g., shipping and/or freight containers), railroad box cars, and the like, or any other suitable structure. Trailer 12 may be structurally similar to typical truck trailers known in the art. For example, trailer 12 may have a pair of opposing side walls 14 and end doors 16 that can open and close to provide access to the interior of trailer 12. In at least some embodiments, flooring 10 may extend across the width and along the length of the interior of trailer 12. Trailer 12 may have a plurality of support members 18 (e.g., "I" beams, "C" beams, hat sections, etc.) that each may have an upper flange or surface that crosses the width of trailer 12 and are spaced along the length of trailer 12. In some embodiments, flooring 10 may be secured to support member 18 by screws (not shown) or any other suitable fastener, which may penetrate through the whole thickness of flooring 10 and the upper flange of support members 18.

As indicated above, flooring 10 may be a reinforced wood flooring. By virtue of being reinforced, flooring 10 may be designed to have a desirable level of strength, stiffness, and the like. This may be desirable for a number of reasons. For example, increased strength may allow flooring 10 to be more resistant to damage and/or wear, carry greater loads (e.g., increase payload), have a greater life, etc. Furthermore, by virtue of using a reinforcing structure (e.g., the "reinforcing underlay" such as underlay 24 described below) in flooring 10, other components of flooring 10 (e.g., the "wood member" such as wood member 22 described below) may be manufactured to be thinner, which may decrease the weight of flooring 10 and improve the fuel economy in trailers using flooring 10. Some additional detail regarding these and other features can be found below.

Figure 2:
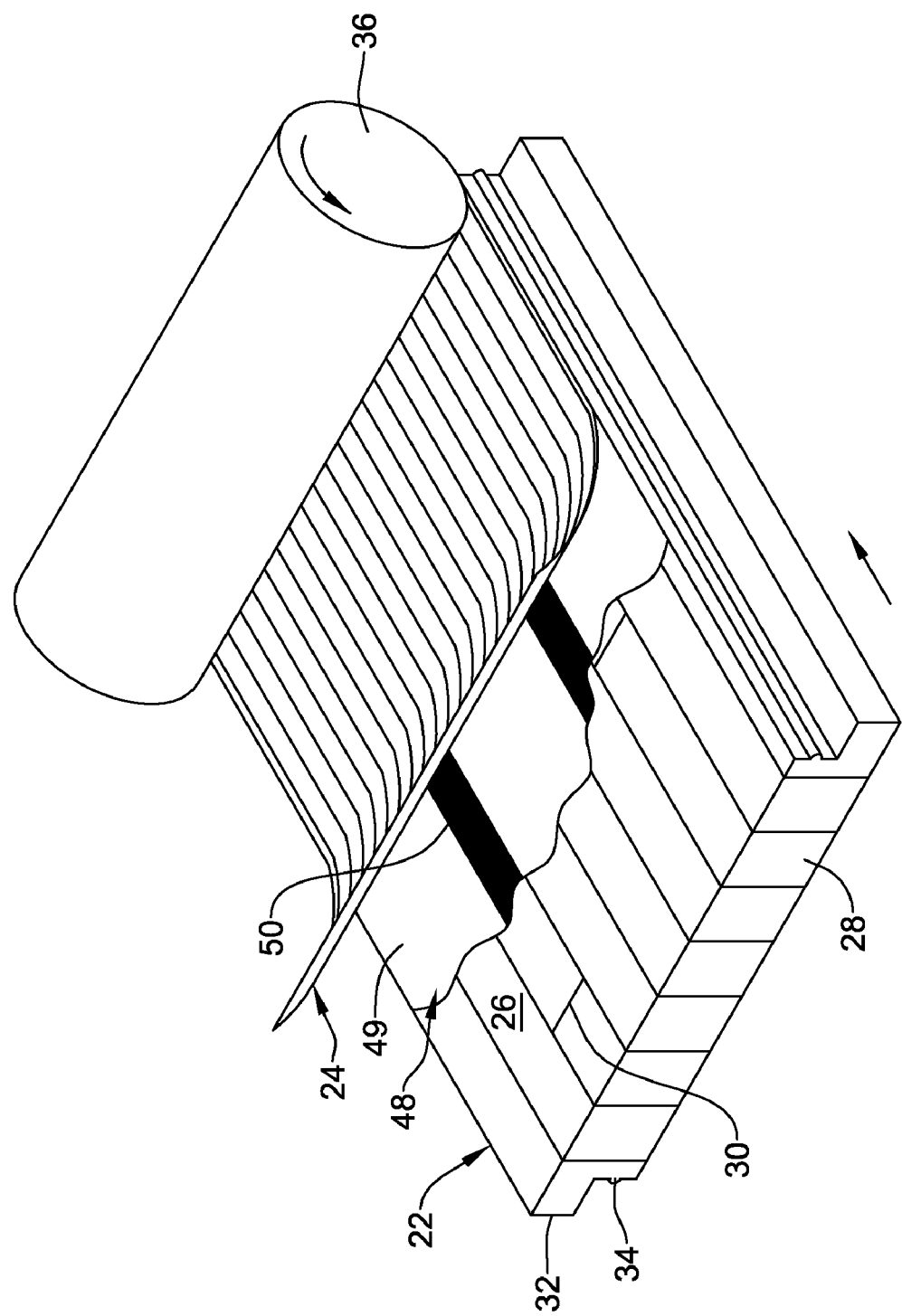
FIG. 2 is a bottom view of a portion of an example wood member and an underlay being disposed on the bottom surface of the wood member.

As suggested above, in at least some embodiments, flooring 10 may include one or more floorboards or wood members 22 and a reinforcing member or underlay 24 disposed along a bottom surface 26 of each wood member 22 as shown in FIGS. 1 and 2. It should be noted that flooring 10 is illustrated "upside-down" from its use configuration in FIG. 2 so that some of the features of flooring 10 can be more easily visualized. Accordingly, it can be appreciated that underlay 24 may be oriented downward when flooring 10 is installed in trailer 12.

Wood member 22 may take the form of a floor board of flooring component that is made from a suitable hardwood such as oak, maple, ash, birch, beech, aspen, elm, poplar, and the like, or any other suitable hardwood. Hardwoods may be desirable, for example, due to their high strength, stiffness, and excellent durability. Alternatively, some softer woods may also be used, where appropriate.

Wood member 22 may include a plurality of wood strips 28 that are fastened together. For example, wood strips 28 are arranged in a side-to-side and end-to-end manner in order to form wood member 22. To manufacture the individual strips 28, green (i.e., not dried) wood logs may be cut into lumber using conventional techniques. The lumber may be kiln-dried so that it has an equivalent moisture content of about 6 to 10%. Alternatively, the lumber may be seasoned or otherwise allowed to dry to the desired moisture content. The dried lumber may be sanded and planed into the desired thickness. For example, the lumber may be sanded and planed so that it has a thickness of about 0.75 to 1.5 inches, or about 1 to 1.25 inches thick. The lumber may also be cut into the desired width, for example, using a ripsaw. For example, the lumber may be cut to have a width of about 0.75 to 2 inches, or about 1 to 1.4375 (i.e., 1 7/16) inches wide.

During the manufacturing of strips 28, any wood defects such as knots, cracks and fractures, bark pockets, cavities and holes by insects, decay by fungi, and stains by molds may be removed by cutting off the defects with, for example, a chop saw or suitable automatic cutting system. It can be appreciated that such cutting may alter the length of strips 28. It may be desirable for minimum length of wood strips 28 to be about 12 inches in wood member 22. Overall, the average length of wood strips 28 may be between about three and three and one-half feet.

Figure 3:
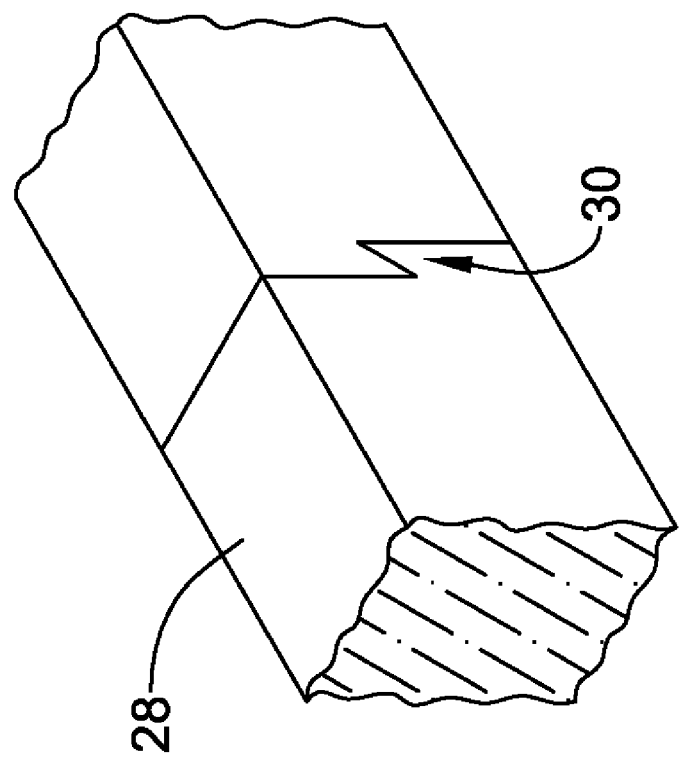
FIG. 3 is a side view of a portion of a wood member illustrating a hook joint.

Both of the opposing ends of each wood strip 28 may be cut into a square shape with, for example, a tennoner saw. The squared ends of wood strips 28 may also be further cut so that "hooks" are formed therein. These hooks allow wood strips 28 to be attached end-to-end by mating adjacent hooks and forming a "hook joint" 30 as illustrated in FIG. 3. The depth or size of hook joint 30 may vary depending on the application. For example, the depth of hook joints 30 may be about 0.25 to 0.75 inches, or about 0.25 to 0.5 inches, or about 0.375 inches. Alternatively, any other suitable type of joint may be utilized to join together wood strips 28.

The suitably prepared wood strips 28 may also be fastened together side-to-side using any suitable attachment technique. For example, the vertical sides or edges of each wood strip 28 may be coated with an adhesive by a roller glue spreader. This may help to secure wood strips 28 across the width of wood member 22. A suitable adhesive for this securing may include urea-melamine formaldehyde, crosslinking polyvinyl acetate, isocyanate, and the like. The glue-coated wood strips 28 may be assembled (e.g., both side-to-side and end-to-end) on a conveyor. This may include manual assembly. The hook joints 30 may fasten together the adjacent ends of strips 28 to form a continuous slab, in which they are jointed end-to-end in a number of rows (as illustrated in FIG. 1). It may be desirable to control the number of hook joints 30 per square foot. For example, it may be desirable to have about 5 to 7 hook joints 30 per square foot on average. The joined collection of wood strips 28 may be placed into a steam or radio frequency hot press under vertical and cross-direction pressures for curing of the adhesive.

Once strips 28 are secured together in the desired fashion, the resultant board may be cut to the desired length. For example, the board may be cut to a length of about 56 feet (or more or less depending on the application). Additionally, the board may also be divided into a number of floorboards or wood members 22 that each have a width, for example, of about 10 to 14 inches or about 12 inches to 12.25 inches. These wood members 22 may be planed (and/or sanded) to a desired thickness. For example, wood member 22 may be planed to a thickness of about 1 to 1.5 inches, or about 1.125 inches, or about 1.3125 inches, or about 1.375 inches, etc.

Trailers like trailer 12 may include a plurality of wood members 22 joined together to form flooring 10. For example, trailer 12 may include about 6 to 10 wood members 22, or about 8 wood members 22, or more or less depending on the application. To facilitate the joining of wood members 22, shiplaps 32 and crusher beads 34, which may be similar to those known in the art, may be machined on to both edges of each wood member 22. Shiplaps 32 may be convenient for installing floorboards on truck trailers by allowing adjacent wood member 22 to overlap. Crusher beads 34 may provide spaces between adjacent wood members 22, which may protect members 22 from buckling due to their expansion in wet conditions.

In some embodiments, bottom surface 26 of wood members 22 may be coated with a water resistant polymeric layer (e.g., latex). However, this may not be necessary when underlay 24 is utilized. Wood members 22 may be sealed at both ends with a water resistant adhesives. To avoid the water or moisture penetration from both ends of reinforced wood flooring 10, a water resistant adhesive resin such as epoxy and crosslinking polyvinyl acetate may also be used at the ends of wood members 22. The top surface of wood members 22 may be optionally coated with a suitable epoxy, lacquer, or varnish to improve the durability and water resistance of wood members 22 during installation and maintenance.

As indicated above, wood members 22 may include underlay 24 along bottom surface 26. Underlay 24 may be an essentially water impermeable underlay 24. More particularly, underlay 24 may essentially prevent water (including liquid water and/or water vapor) from passing therethrough. Accordingly, using a water impermeable underlay 24 may be desirable because it may form a water barrier at the bottom of flooring 10, where flooring 10 would otherwise be exposed to the outside environment.

In addition, underlay 24 may include a structure that may add desired strength to wood member 22. This may be desirable for a number of reasons. For example, adding strength may improve wear resistance, extend life, increase the payload of a trailer (e.g., trailer 12), etc. In at least some embodiments, underlay 24 includes a fiber reinforced plastic (FRP). An FRP, as known for conventional FRPs, may include a plurality of continuous reinforcing fibers that are impregnated with or otherwise include a polymeric resin or matrix. The continuous fibers may be carbon fibers, glass fibers, aramid fibers (e.g., Kevlar® by DuPont & Co.), and the like, or mixtures and/or combinations thereof. The fibers may make up about 50-90%, or about 60-80%, or about 70% of the weight of underlay 24.

In at least some embodiments, an example underlay 24 may include a combination of glass fibers and aramid fibers. These fibers may be divided so that the ratio of glass fibers to aramid fibers, by weight, may be about 8:1 to 10:1, or about 9:1. For example, an example underlay 24 may include about 60-65% (e.g., about 63%) glass fibers and about 5-10% (e.g., about 7%) aramid fibers. Of course, other ratios and/or fibers may also be utilized.

The polymeric resin or matrix may include a thermosetting adhesive such as polyester, vinyl ester, polyurethane, phenol formaldehyde, epoxy, phenolic, or the like. Optionally, the FRP also may include a thermoplastic resin such as polyethylene, polypropylene, polyvinyl chloride, polyamide (e.g., polyamide 6 and polyamide 6/6), polyethylene terephthalate, and the like, or any other suitable material. The FRP may be manufactured according to conventional manufacturing processes such as pultrusion, as known in the art.

The arrangement of the fibers in underlay 24 may also vary. In some embodiments, all of the fibers in underlay 24 may be oriented in the same direction. For example, underlay 24 may include fibers that are all oriented in the longitudinal direction (i.e., along the length of trailer 12). In some other embodiments, most of the fibers may be oriented in the longitudinal direction. Alternatively, some of the fibers in underlay 24 may be oriented in one direction and some of the fibers may be disposed in a different direction such as, for example, perpendicularly to those fibers. For example, underlay 24 may include about 70% or more of the fibers oriented in the longitudinal direction and the balance of them arranged perpendicular to those fibers, or about 80% or more of the fibers oriented in the longitudinal direction and the balance of them arranged perpendicular to those fibers, or about 90% or more of the fibers oriented in the longitudinal direction and the balance of them arranged perpendicular to those fibers.

Underlay 24 may also vary in thickness. In some embodiments, underlay may be about 0.025 to about 0.050 inches thick, or about 0.030 to about 0.040 thick, or about 0.033 inches thick. Underlays 24 of these thicknesses may provide a suitable degree of reinforcement while being sufficiently thin so as to reduce the overall weight of flooring 10. This may desirably impact the properties of flooring 10 by allowing for trailers such as trailer 12 to consume less fuel when transporting goods (i.e., less fuel consumption with the same payload) or the ability to carry more goods (i.e. increased payload).

Furthermore, FRP underlays 24 may reinforce wood member 22 sufficiently so that wood members 22 may be further thinned, which also may desirably reduce the weight of flooring 10.

Underlay 24 may be attached to wood member 22 using a suitable adhesive or adhesive layer (such as adhesive layer 48, which is illustrated cut away in FIG. 2). For example, adhesive layer 48 may include a hot melt reactive polyurethane resin (e.g., PUR polyurethane resin) or any other suitable adhesive. It should be noted that the following discussion describes the use of PUR in flooring 10 but this is not intended to limit the invention as essentially any other suitable adhesive may be used for adhesive layer 48 without departing from the spirit of the invention.

The PUR adhesive may be placed on a reservoir adjacent a pair of heated rollers, including, for example, roller 36. The temperature of rollers may be controlled to be between 260 and 280° F., which may melt the PUR material. Alternatively, molten PUR may be applied directly to roller 36. After the PUR resin is completely melted, wood members 22 may pass through a gap between the rollers and wood members 22 are coated with the PUR material. Underlay 24 may be quickly laid onto the glueline (i.e., the layer of PUR material disposed on wood members 22) and pass through a pair of cold rollers (also called pinch rollers) under pressure. The pressure of the pinch rollers may be adjusted to achieve a desirable bonding strength as well as the desired distribution of adhesive (e.g., avoiding and/or limiting "pinch out" of adhesive). The resultant reinforced wood flooring 10 is stored at room temperature for 24 hours to complete further solidification and/or curing of the PUR. The FRP edges of the cured reinforced wood flooring 10 may be trimmed with a suitable cutting tool to remove any excess material. This may form the reinforced wood flooring 10 (and/or one of the floor boards making up flooring 10).

Hot melt reactive polyurethanes like PUR may be desirable for a number of reasons. For example, hot melt reactive polyurethanes may provide excellent bonding between wood (e.g., wood members 22) and FRP plies (e.g., underlays 24). However, the holt melt reactive polyurethanes are relatively expensive. In addition, completely and/or continuously coating wood member 22 with the PUR material may add weight to flooring 10. Because of these factors, it may be desirable to reduce the amount of PUR utilized in flooring, for example, to reduce manufacturing costs and/or weight of flooring 10.

In at least some embodiments, adhesive layer 48 is a discontinuous layer of adhesive and/or a discontinuous glue pattern may be utilized to reduce the amount of PUR used. For example, adhesive layer 48 may include an adhesive portion or portions 49 and an adhesive lacking portion or portions 50. It should be noted that adhesive lacking portions 50 are illustrated as darkened strips in the figures. This is done so that these portions 50 can be more easily visualized. For the purpose of this invention, a discontinuous layer of adhesive and/or a discontinuous glue pattern (which may also be termed a "glueline" in the art) may be understood to be layer of adhesive or a glue pattern that is designed to cover less than all of the surface area of bottom surface 26 of wood members 22. For example, discontinuous layer of adhesive 48 may cover less than 100% of the surface area of bottom surface 26 of wood members 22, or about 98% or less of the surface area of bottom surface 26 of wood members 22, or about 96% or less of the surface area of bottom surface 26 of wood members 22, or about 95% or less of the surface area of bottom surface 26 of wood members 22, or about 90% or less of the surface area of bottom surface 26 of wood members 22. These discontinuous layers of adhesive 48 differ from a continuous layer of adhesive (and/or continuous glueline), which is designed to cover essentially 100% of the surface area of a wood member surface.

Figure 4:
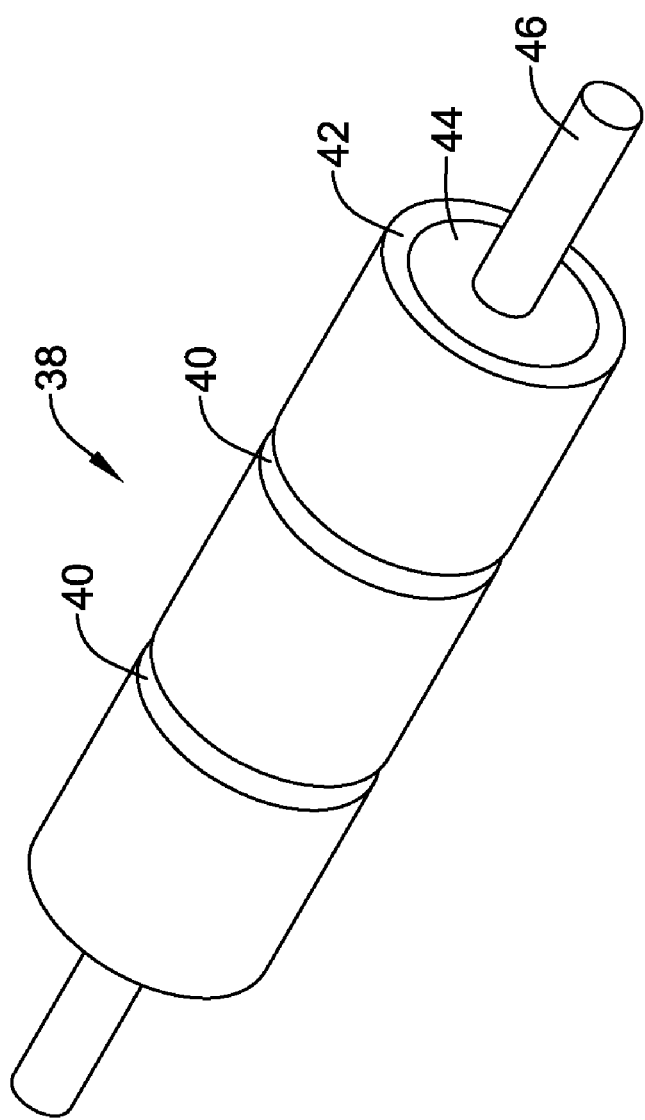
FIG. 4 is a perspective view of an example roller.

Forming discontinuous layer of adhesive 48 may include the use of a coating roller with a varying format to apply the adhesive to wood member 22. For example, a coating roller 38 for applying discontinuous layer of adhesive 48 on bottom surface 26 of wood member 22 is illustrated in FIG. 4. Roller 38 may include one or more grooves or recesses 40, a base or rubber layer 42, a drum 44, and axis shaft 46. It can be appreciated that grooves 40 are arranged substantially parallel to one another in roller 38. Other rollers are contemplated where grooves 40 may intersect.

Base layer 42 may be the adhesive applying portion of roller 38. The material for base layer 42 may be selected based on a good balance of elasticity and stiffness. For example, base layer 42 may include a natural or a synthetic rubber such as silicone, neoprene, styrene butadiene rubber, EPDM rubber, fluoro-silicone, polyisoprene, nitrile, polyurethane, viton, or the like. It may also be convenient to select these materials because they may be easy to be cut them into certain shapes by machine in order to form a variety of different coating patterns and/or coating designs. Grooves 40 may be formed by cutting away or removing a portion of the base layer 42. By doing so, grooves 40 are designed so that they essentially will not apply adhesive to wood member 22. Additionally, a suitable "groove cleaning" structure or assembly (e.g., another roller with projections designed to "mate" with grooves 40) may be utilized that can clean out or otherwise remove adhesive that may become disposed in grooves 40.

Figure 5:
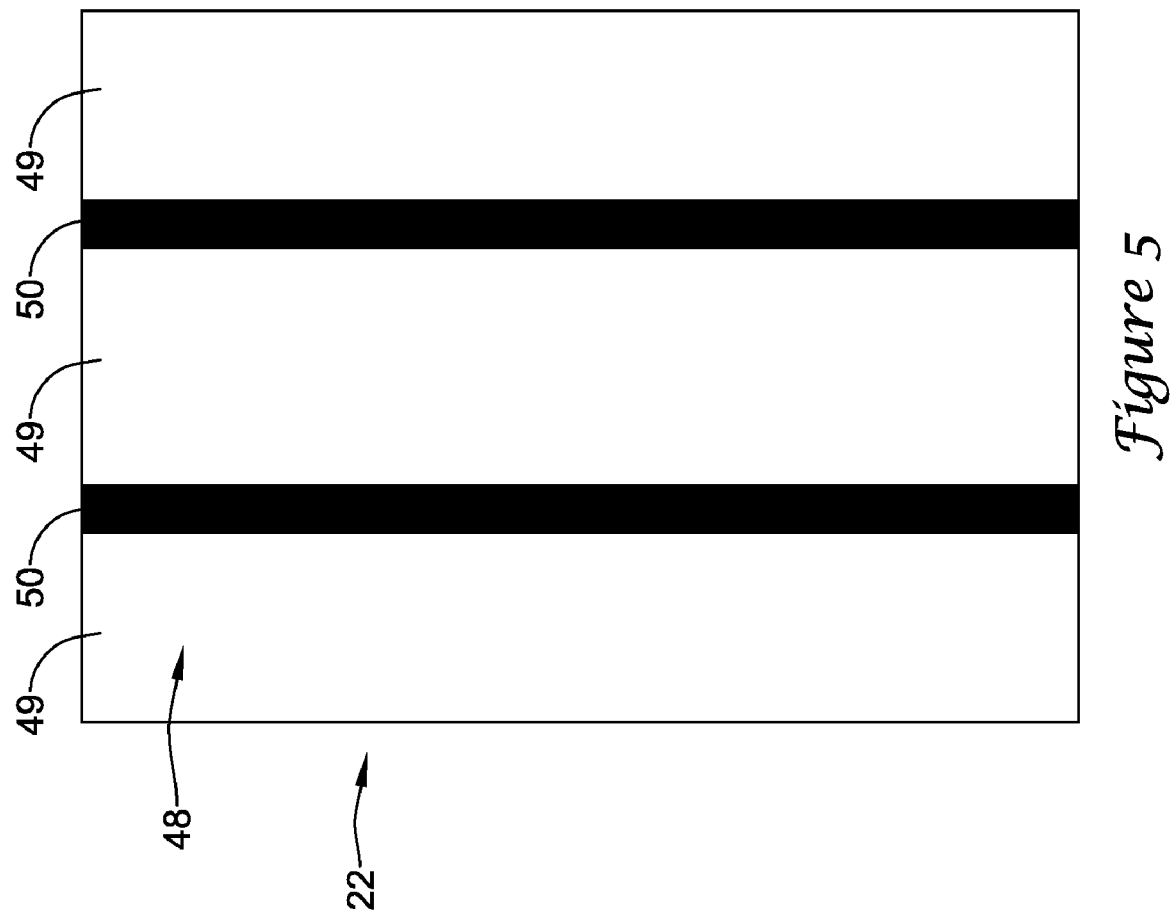
FIG. 5 illustrates an example layer of adhesive on a wood member.

In use, adhesive may be applied to roller 38, for example, by heating roller 38 and rolling it through the adhesive (e.g., PUR). In doing so, adhesive may be applied to base layer 42 (i.e., the adhesive applying portion of roller 38) but not grooves 40. Wood member 22 may then be fed through roller 38 (e.g., with the rotation of roller 38 being the same as the feeding direction of wood member 22). When roller 38 contacts wood member 22, base layer transfers adhesive to wood member 22 (e.g., at adhesive portion 49) whereas grooves 40 essentially do not transfer adhesive to wood member 22 and, instead, leave or form portions 50, which lack adhesive as shown in FIG. 5. This pattern defines discontinuous layer of adhesive 48 along bottom surface 26 of wood member 22.

Figure 6:
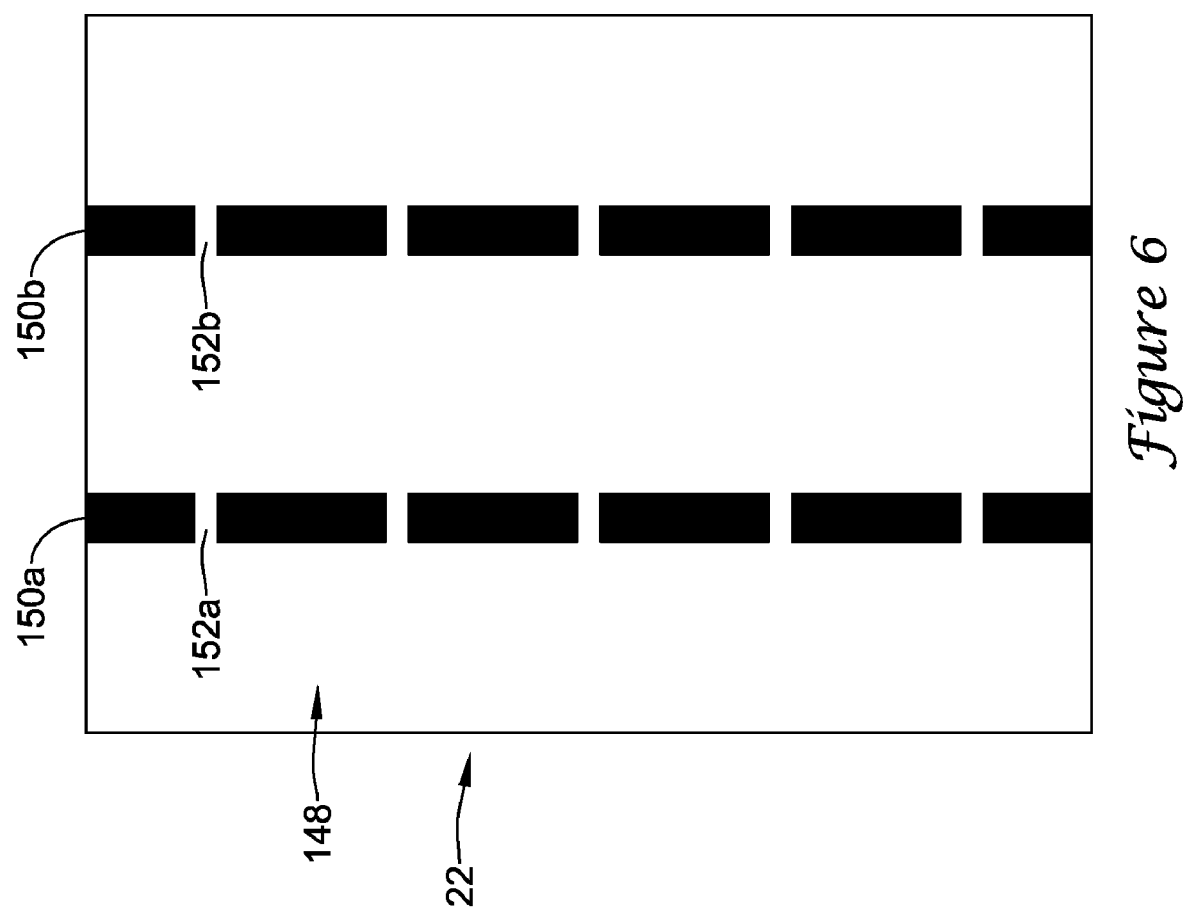
FIG. 6 illustrates another example layer of adhesive on a wood member.
Figure 7:
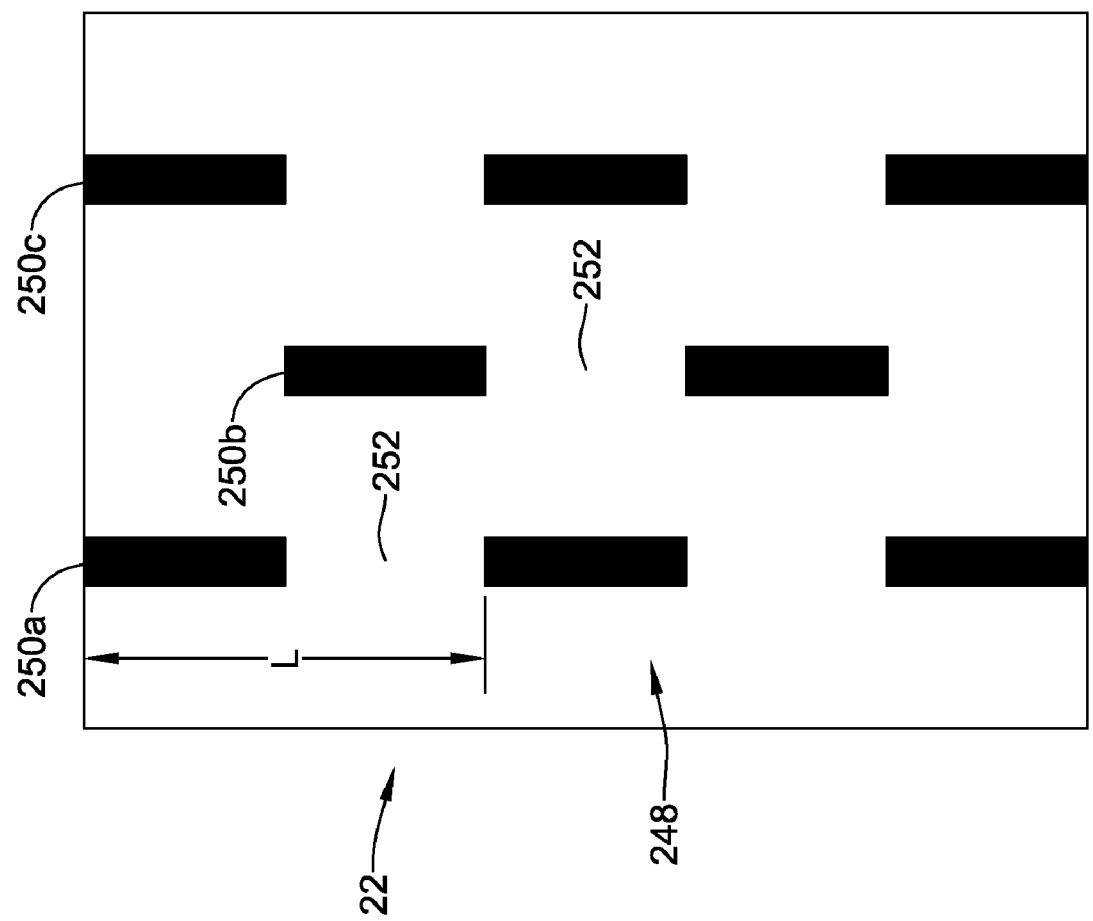
FIG. 7 illustrates another example layer of adhesive on a wood member.
Figure 8:
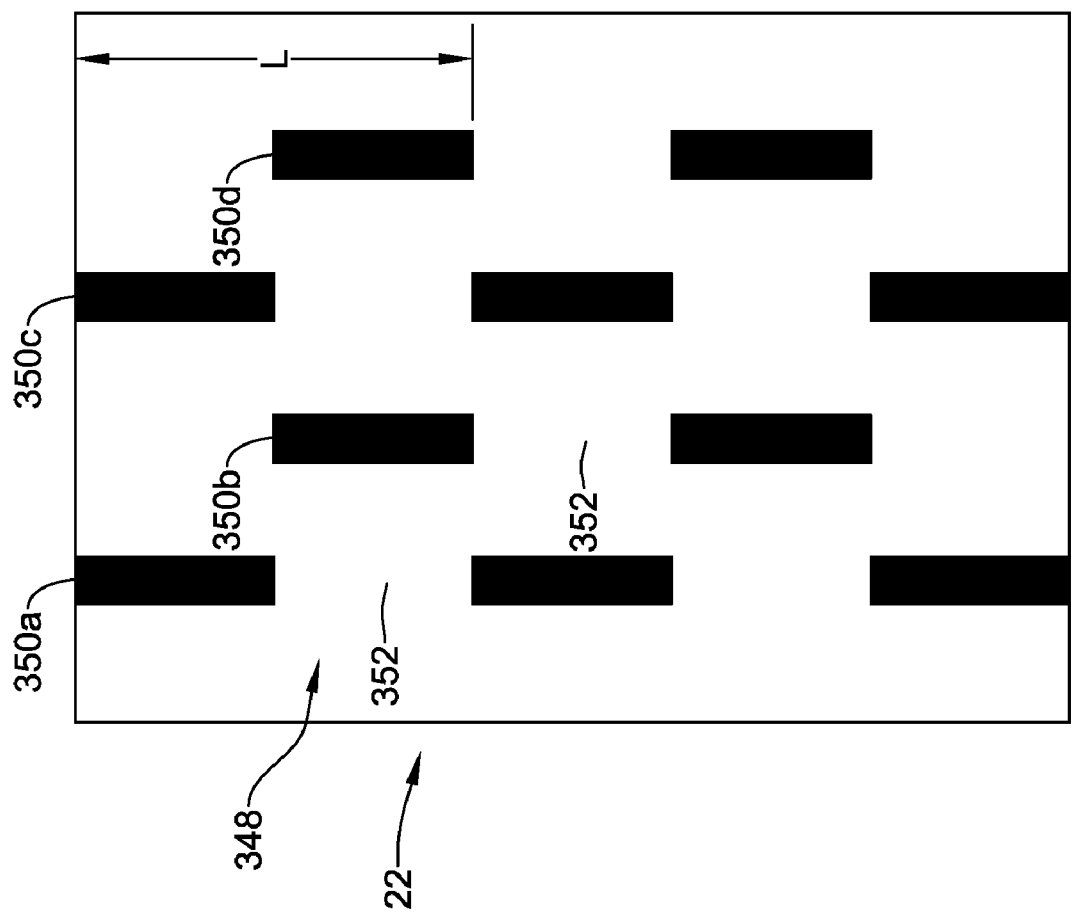
FIG. 8 illustrates another example layer of adhesive on a wood member.

It can be appreciated that roller 38, by virtue of having grooves 40 arranged parallel to one another, forms adhesive-lacking portions 50 that are arranged as two parallel strips extending longitudinally along wood member 22. This arrangement, however, is not intended to be limiting. Indeed, base layer 42 can be cut into essentially any desired shape to form a discontinuous layer of adhesive having a different pattern. FIGS. 6-8 illustrate some of the example patterns that are contemplated. For example, FIG. 6 illustrates a discontinuous layer of adhesive 148 where adhesive-lacking portions 150*a*/150*b* are arranged as strips with broken or interrupted regions 152*a*/152*b* that include adhesive and/or are part of adhesive layer 148. FIG. 7 illustrates a discontinuous layer of adhesive 248 that includes three parallel adhesive-lacking strips 250*a*/250*b*/250*c* that are broken by regions 252 that include adhesive 48 and/or are part of adhesive layer 248. The length L may be equal to the perimeter of the coating roller used to form layer 248. Accordingly, the alternating strips 250*a*/250*b*/250*c* have a length that is equal to about half the perimeter of the roller. This may help better distribute the local stress on the discontinuous layer of adhesive 248 and thus effectively reduce the stress concentration along the discontinuous layer of adhesive. FIG. 8 illustrates a discontinuous layer of adhesive 348 that includes four parallel adhesive-lacking strips 350*a*/350*b*/350*c*/350*d* that are broken by regions 352 that include adhesive and/or are part of adhesive layer 348. The patterns illustrated in FIGS. 6-8 illustrate that essentially any suitable number of adhesive-lacking portions may be utilized and that these portions may or may not be broken or interrupted.

Figure 9:
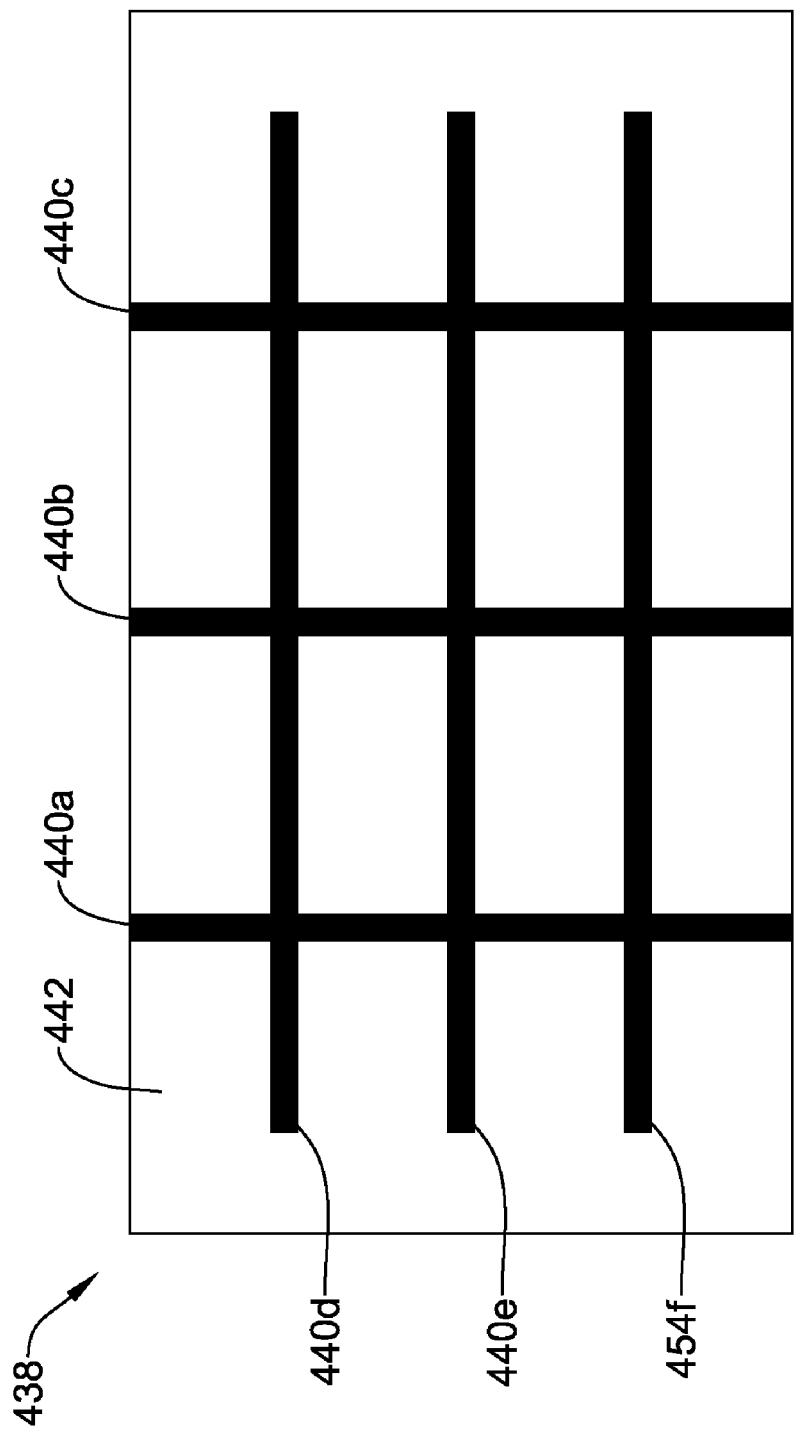
FIG. 9 illustrates a portion of an example roller for applying a layer of adhesive on a wood member.
Figure 10:
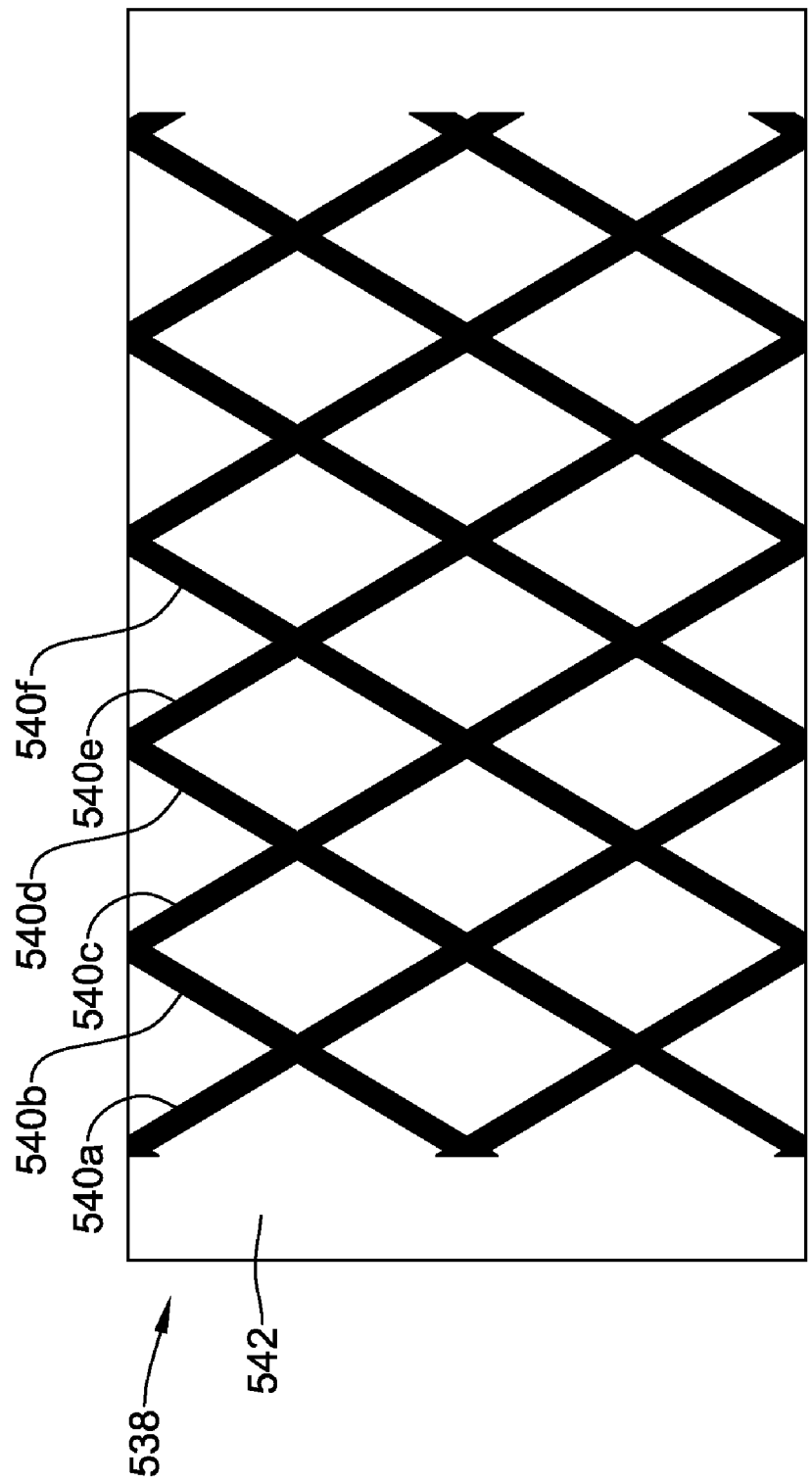
FIG. 10 illustrates a portion of another example roller for applying a layer of adhesive on a wood member.
Figure 11:
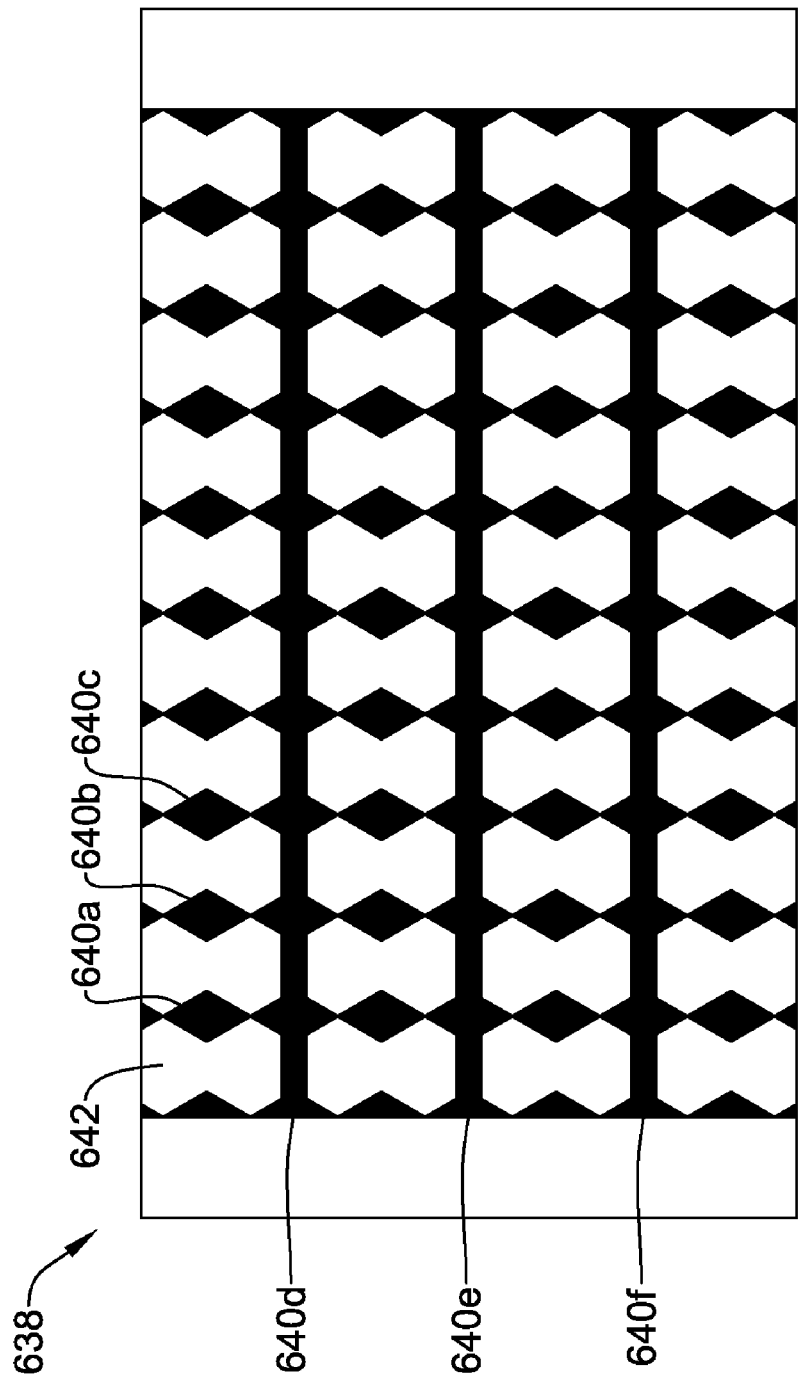
FIG. 11 illustrates a portion of another example roller for applying a layer of adhesive on a wood member.

FIGS. 9-11 illustrate portions of example rollers that may be utilized to form additional discontinuous layers of adhesive. For example, FIG. 9 illustrates a portion of roller 438 that includes base 442 and three grooves 440*a*/440*b*/440*c* that are intersected by three more grooves 440*d*/440*e*/440*f*. Similarly, FIG. 10 illustrates a portion of roller 538 that includes base 542 and a plurality of intersecting diagonal grooves 540*a*/540*b*/540*c*/540*d*/540*e*/540*f*. This may form a discontinuous layer of adhesive that takes the form of a web or web-like configuration. The patterns illustrated in FIGS. 9-10 illustrates that intersecting configurations having essentially any suitable number of grooves may be utilized for forming discontinuous layers of adhesives.

Finally, FIG. 11 illustrates a portion of an example roller 638 that includes base 642 and a plurality of grooves 640*a*/640*b*/640*c* having a complex geometry intersected by grooves 640*d*/640*e*/640*f*. In the embodiment shown in FIG. 11, grooves 640*a*/640*b*/640*c*/640*d*/640*e*/640*f* are arranged so that base 642 has a shape resembling a pair of hexagons adjoined hexagons. Designs like the one shown in FIG. 11 may help evenly distribute the stress of adhesive on reinforced wood flooring 10 and effectively reduce the amount of adhesive applied to wood members 22. This figure illustrates that the adhesive-lacking strips of a discontinuous layer of adhesive need not take the form of lines and that essentially any suitable shape pattern may be utilized without departing from the spirit of the invention.

When applying adhesive 48 in any of the patterns disclosed above, it may be desirable to keep any of the adhesive-lacking strips away from the lateral edge of wood member 22. For example, it may be desirable for any of the adhesive-lacking portions or strips to be at least one inch away from the edges wood member 22. This may help to reduce and/or avoid contact of moisture or water with wood member 22.

To avoid the water or moisture penetration from both ends of reinforced wood flooring 10 into the discontinuous layer of adhesive, certain water resistant adhesive resins such as epoxy and crosslinking polyvinyl acetate may be used. The surface sealing by these adhesives may improve performance and durability of reinforced wood flooring 10 with a discontinuous layer of adhesive.

EXAMPLES

The invention may be further clarified by reference to the following Examples, which serve to exemplify some of the preferred embodiments, and not to limit the invention in any way.

Example 1

A fiberglass reinforced polyurethane ply having a nominal thickness of 0.033 inches was used for underlay 24. The resin included about 30% by weight polyurethane. In this example, the FRP underlay 24 included approximately 7% by weight of aramid fibers and about 63% by weight of glass fibers. Use of aramid fiber may significantly improve mechanical performance of the FRP underlay 24 and allow it to have a reduced thickness. At least 90% of the reinforcing fibers were arranged so that they lined up longitudinally along wood member 22.

A hot melt reactive PUR resin was used for the adhesive 48 for bonding the FRP underlay 24 to wood member 22. The melting temperature of PUR is about 260° F.

Laminated wood members 22 were used to manufacture an example reinforced wood flooring 10. The nominal thickness of wood members 22 was about 1.0625 (1 1/16) inches. The target thickness of reinforced wood flooring 10 was about 1.125 inches.

Wood members 22 were manufactured according to the aforementioned procedures. An example wood member 22 was coated with hot melt reactive PUR through the roller coater 38. This resulted in a discontinuous layer of adhesive where adhesive 48 was applied to portions of wood member 22 and two continuous, parallel adhesive-lacking strips 50 were formed as illustrated in FIG. 5. In this example, the adhesive layer 48 was about 0.020 inches in thickness.

An FRP underlay 24 was then disposed on adhesive-coated wood member 22 and the structure was passed through a pair of pinch rollers while applying pressure. The resultant reinforced wood floorboards 10 were stored at room temperature and at a relative humidity of 50% for 72 hours prior to mechanical testing.

Example 2

Flexural and dry shear properties of reinforced wood flooring 10 formed in Example 1 were tested in accordance with ASTM standard ASTM D198. For the flexural test, a three point bending mode was applied. The flexural span was 30 inches. The testing speed was 0.48 inch/min.

In addition, a wet shear test was conducted for reinforced wood flooring 10. The wet shear test follows a soaking-drying procedure by an industrial standard. The flooring 10 samples were submerged 2 inches down from the water level and soaked in tap water for 48 hours. They were then placed in an oven at 140° F. and dried for 16 hours. After that, they were removed from the oven and soaked again for another 8 hours. Finally, flooring 10 samples were removed from water and allowed to dry for 2 hour before shear testing. These procedures were also performed on control flooring samples including a sample laminated wood floorboard lacking underlay 24 (hereafter Control 1) and a sample flooring with a continuous layer of adhesive (hereafter Control 2).

The results of the mechanical testing are listed in Table 1.

TABLE 1

Mechanical performance of discontinuous layer of adhesive.

| Test sample | Thickness (inch) | Max. flexural load (lbs) | Flexural strength (psi) | Flexural modulus (psi) | Maximum shear load (lbs) | |
|---|---|---|---|---|---|---|
| | | | | | Dry | Wet |
| Control 1[1] | 1 1/8 | 3,850 | 11,027 | 1,600,000 | 1,850 | 800 |
| Control 2[2] | 1 1/8 | 7,102 | 21,220 | 2,006,272 | 5,437 | 3,455 |
| Flooring 10[3] | 1 1/8 | 6,771 | 20,229 | 1,935,184 | 4,675 | 3,360 |

[1] Laminated oak floorboards, values of mechanical properties are the baseline required by the industry standard.
[2] Reinforced oak floorboards with continuous layer of adhesive.
[3] Reinforced oak floorboards with a discontinuous layer of adhesive.

As shown in Table 1, the reinforced wood floorboards (e.g., Control 2 and flooring 10) are much stronger and stiffer than laminated wood floorboards (Control 1). At the same nominal thickness, the discontinuous layer of adhesive in flooring 10 decreases by only about 5% and 16% in flexural and dry shear strengths, respectively. However, both have the same performance in wet shear. These results unexpectedly indicate that a significant savings in material and manufacturing costs can be achieved using a discontinuous layer of adhesive without compromising strength and performance of flooring 10.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. A reinforced wood flooring for truck trailers and containers, comprising:

a wood member having a top surface and a bottom surface, wherein the wood member includes a plurality of wood strips that are attached together;

an underlay essentially impermeable to liquid water and to water vapor attached to the bottom surface of the wood member with a discontinuous layer of adhesive, the underlay having a thickness of about 0.025 inches to about 0.050 inches;

wherein the underlay includes a fiber reinforced plastic that includes a plurality of continuous fibers and a polymeric resin; and wherein in at least a portion of the underlay, 95% or more of the continuous fibers are aligned in the longitudinal direction.

2. The reinforced wood flooring of claim 1, wherein the wood member include oak, maple, ash, birch, or beech.

3. The reinforced wood flooring of claim 1, wherein the continuous fibers include glass fibers and aramid fibers.

4. The reinforced wood flooring of claim 1, wherein the polymeric resin includes polyurethane.

5. The reinforced wood flooring of claim 1, wherein the discontinuous layer of adhesive includes a hot melt reactive polyurethane.

6. The reinforced wood flooring of claim 1, wherein bottom surface of the wood member has a surface area and wherein the discontinuous layer of adhesive covers 98% or less of the surface area of the bottom surface.

7. The reinforced wood flooring of claim 1, wherein bottom surface of the wood member has a surface area and wherein the discontinuous layer of adhesive covers 96% or less of the surface area of the bottom surface.

8. The reinforced wood flooring of claim 1, wherein bottom surface of the wood member has a surface area and wherein the discontinuous layer of adhesive covers 90% or less of the surface area of the bottom surface.

9. A reinforced wood flooring for truck trailers and containers, comprising:

a wood member having a top surface and a bottom surface, wherein the wood member includes a plurality of wood strips that are attached together;

an underlay essentially impermeable to liquid water and to water vapor attached to the bottom surface of the wood member with a discontinuous layer of adhesive;

wherein the underlay includes a fiber reinforced plastic that includes a plurality of continuous fibers and a polymeric resin, the continuous fibers including glass fibers and aramid fibers;

wherein the ratio of glass fibers to aramid fibers by weight is about 8:1 to about 10:1;

wherein the discontinuous layer of adhesive forms a pattern along the bottom surface; and wherein the reinforced wood flooring has a flexural strength of at least about $2.0 \times 10^4$ pounds per square inch.

10. The reinforced wood flooring of claim 9, wherein the pattern includes a pair of parallel sections that are free of adhesive.

11. The reinforced wood flooring of claim 9, wherein the pattern includes a pair of intersecting sections that are free of adhesive.

12. A method of manufacturing a reinforced wood flooring for truck trailers and containers, the method comprising the steps of:

provinding a wood member having a top surface and a bottom surface; and attaching an underlay that is essentially impermeable to liquid water and to water vapor to the bottom surface of the wood member with a discontinuous layer of adhesive, the underlay having a thickness of about 0.025 inches to about 0.050 inches;

wherein the underlay includes a fiber reinforced plastic that includes a plurality of continuous fibers and a polymeric resin, the continuous fibers including glass fibers and aramid fibers; and wherein the ratio of glass fibers to aramid fibers by weight is about 8:1 to about 10:1.

13. The method of claim 12, wherein the step of providing a wood member includes providing a plurality of wood strips that are attached together.

14. The method of claim 12, wherein the step of attaching an underlay that is essentially impermeable to liquid water and to water vapor to the bottom surface of the wood member with a discontinuous layer of adhesive includes applying the discontinuous layer of adhesive to the bottom surface of the wood member with a roller, wherein the roller has an adhesive applying section and one or more grooves formed in the adhesive applying section.

15. The method of claim 14, wherein the roller includes two grooves that are disposed parallel to one another.

16. The method of claim 14, wherein the roller includes two grooves that intersect one another.

17. A reinforced wood flooring for truck trailers and containers, comprising:

a plurality of floor boards joined together, each of the floor boards including a plurality of hardwood strips that are attached together, a top surface, and a bottom surface;

a fiber reinforced plastic member that is essentially impermeable to liquid water and to water vapor attached to the bottom surface of each of the floor boards with a discontinuous layer of adhesive, the fiber reinforced plastic member including a plurality of continuous fibers and a polyurethane resin, the plurality of continuous fibers including glass fibers and aramid fibers;

wherein the underlay has a thickness of about 0.025 inches to about 0.050 inches;

wherein the ratio of glass fibers to aramid fibers by weight is about 8:1 to about 10:1;

wherein in at least a portion of the underlay, 95% or more of the continuous fibers are aligned in the longitudinal direction;

wherein the reinforced wood flooring has a flexural strength of at least about $2.0 \times 10^4$ pounds per square inch; and wherein the reinforced wood flooring has a flexural modulus of at least about $1.9 \times 10^6$ pounds per square inch.

18. The reinforced wood flooring of claim 17, wherein the underlay is free of a cellulosic material.

19. The reinforced wood flooring of claim 17, wherein the underlay consists of a polyurethane resin, glass fibers, and aramid fibers.

20. The reinforced wood flooring of claim 17, wherein continuous fibers make up about 60-80% of the weight of the underlay.

21. The reinforced wood flooring of claim 17, wherein continuous fibers make up about 70% by weight of the underlay.

* * * * *